United States Patent Office 3,109,866
Patented Nov. 5, 1963

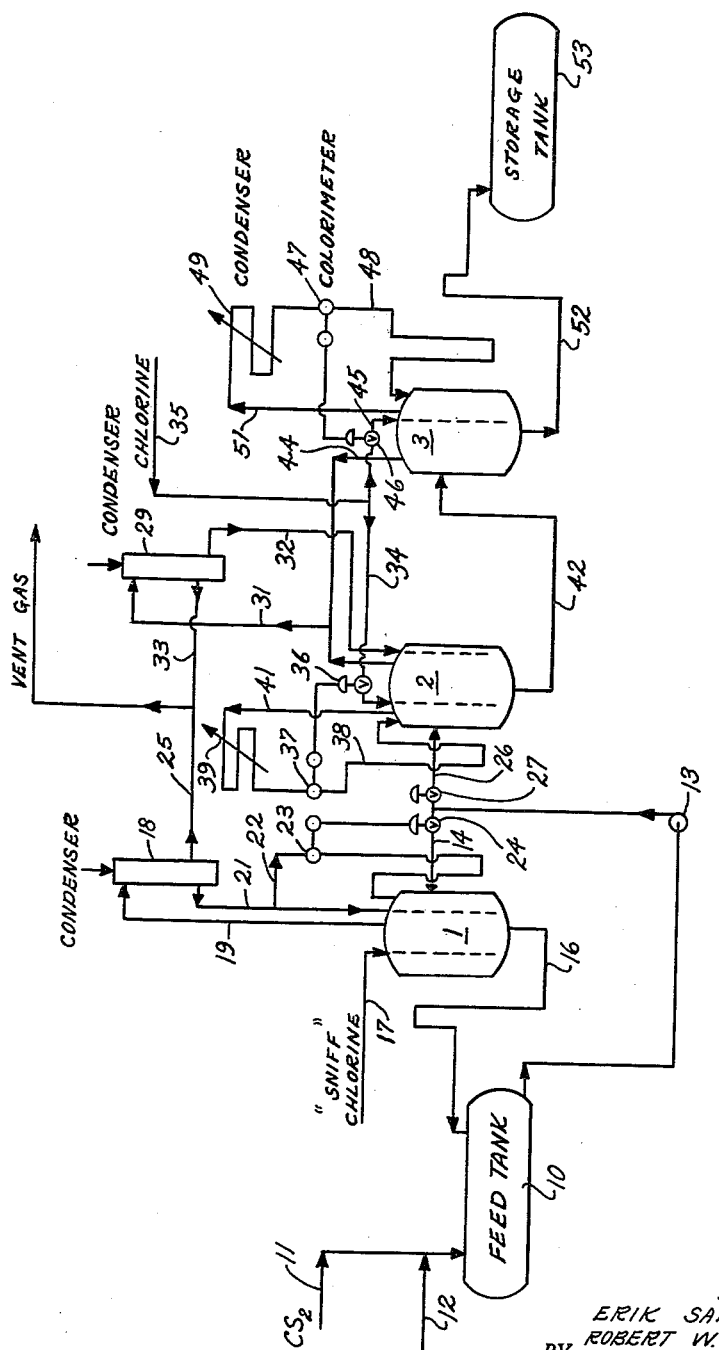

3,109,866
CHLORINATION OF CARBON BISULFIDE-CONTAINING MIXTURES TO PRODUCE CARBON TETRACHLORIDE
Erik Saller, Tonawanda, N.Y., Robert W. Timmerman, Charleston, W. Va., John L. Bennetts, Stamford, Conn., and Phillip E. Armstrong, South Charleston, W. Va., assignors to FMC Corporation, a corporation of Delaware
Filed Aug. 13, 1959, Ser. No. 833,573
7 Claims. (Cl. 260—664)

This invention relates to the chlorination of carbon bisulfide and, more particularly, to the chlorination of mixtures containing carbon bisulfide, carbon tetrachloride and sulfur monochloride as the principal constituents to chlorinate the carbon bisulfide content of such mixtures to produce carbon tetrachloride.

The reaction of carbon bisulfide with chlorine is a violent exothermic reaction which is difficult to control. As heretofore carried out, it involved batchwise chlorination in a large number of tanks in order to obtain the desired capacity. Each of the tanks was charged with a mixture containing not more than about 10% carbon bisulfide to minimize fire and explosion hazards. Among other problems presented by such batch procedures is the control of the end-point. Usually this control was effected by an operator observing the color of the batch during the chlorination and removing the batch when the reaction mixture approached or acquired a reddish color indicating the formation of sulfur dichloride.

The reliance on color in such batch techniques, however, is frequently misleading and requires long experience to judge correctly the color change. The reaction of carbon bisulfide with chlorine may be represented by the following equation:

(1) 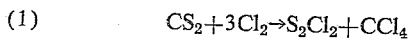
$$CS_2 + 3Cl_2 \rightarrow S_2Cl_2 + CCl_4$$

Sulfur monochloride also reacts with chlorine in accordance with the following equation:

(2) 
$$S_2Cl_2 + Cl_2 \rightarrow 2SCl_2$$

Of these two reactions, (2) proceeds at a relatively fast rate compared to (1).

Sulfur dichloride reacts with carbon bisulfide in accordance with the following equation:

(3) 
$$4SCl_2 + CS_2 \rightarrow CCl_4 + 2S + 2S_2Cl_2$$

Reaction (3) is much slower than either reaction (1) or (2).

Since reaction (2) takes place at a rate comparable that of reaction (1), the appearance of a reddish color due to the presence of sulfur dichloride is frequently an unreliable indication that the true end-point has been reached. An operator may remove a "red" batch, but due to the reaction of the sulfur dichloride with the carbon bisulfide in accordance with Equation 3 the batch may still contain relatively large amounts of unreacted carbon bisulfide.

Obviously such batch operations are seriously objectionable not only because of the objections inherent in batch techniques, including excessive space occupied by the large number of reactors required for desired capacity, construction and maintenance costs for the multiplicity of units, but also because of the loss of carbon bisulfide entailed in such operations as explained above. Furthermore, commercial carbon tetrachloride must contain only small traces of carbon bisulfide; removal of carbon bisulfide from chlorination product is naturally more difficult if the initial concentration is high. In such batch chlorination techniques, during the initial stages of the chlorination, the amount of chlorine present in each tank is relatively high, the chlorine being consumed as the reaction proceeds, with concurrent relatively rapid corrosion of the tank walls.

It is a principal object of the present invention to provide a process of reacting carbon bisulfide-containing mixtures with chlorine, which process is continuous and is substantially if not completely free of the objectionable features of batch procedures heretofore used.

Another object of this invention is to provide such process for chlorinating carbon bisulfide-containing mixtures, which process results in the production of a reaction mixture having the desired end-point and permits of the ready control of this end-point within narrow limits.

Still another object of a preferred embodiment of this invention is to provide such chlorinating procedure in which sniff gas (a gas produced as a byproduct in chlorine plants from operations of liquefaction and filling tanks and cylinders with liquid chlorine under air pressure, which gas contains inert gas, principally air, and chlorine in varying amounts and which heretofore was wasted or recovered only by costly or inefficient means) may be employed to conveniently and beneficially utilize the chlorine content thereof to react with carbon bisulfide and produce carbon tetrachloride.

Other objects and advantages of this invention will be apparent from the following detailed description thereof.

In accordance with this invention, the reaction of the carbon bisulfide-containing mixture and chlorine is carried out continuously by flowing a stream of the mixture and of the chlorine into the first or initial of at least two reaction zones maintained under reflux conditions. The carbon bisulfide is reacted with the chlorine in this initial zone to effect reaction of from 80% to 98% of the carbon bisulfide present and a stream of the resultant reaction mixture is passed continuously from this zone into a discharge zone into which chlorine is also introduced, the rate of introduction of the chlorine or of the reaction mixture being controlled by the color of the reaction product produced in the discharge zone to complete the reaction and produce a reaction mixture containing from 0.03% to 0.1% carbon bisulfide, which reaction mixture is continuously removed from the discharge zone.

Thus, for example, the chlorination can be carried out in two or three vessels, each of which is markedly smaller than the batch chlorination tanks heretofore used, but of sufficient capacity, with the throughput employed, to give the desired capacity of carbon tetrachloride product. With continuous flow of carbon bisulfide-containing mixture having a concentration hereinafter disclosed and continuous introduction of chlorine at a rate to provide for reaction of 80% to 98% in the initial stage, and the substantial completion of the chlorination of the carbon bisulfide in the final or discharge stage, unlike prior known batch procedures, in which in each tank the free chlorine and carbon bisulfide concentrations are initially very high and as the reaction proceeds becomes lower and lower, the chlorine concentration throughout the reaction in the continuous procedure of the present invention is not excessive with consequent minimization of corrosion problems, and the average carbon bisulfide concentration remains low with consequent minimization of hazard to safety. Operating in accordance with this invention, with continuous flow of the reactants and reaction products, through the respective zones, reflux conditions in the reaction zones and control of either the chlorine feed or reaction mixture feed in accordance with the color of the reaction product, substantially complete reaction of the carbon bisulfide is effected with practically no loss of carbon bisulfide and maximum conversion to carbon tetrachloride.

In accordance with a preferred embodiment of the present invention, chlorination is carried out in three zones, in the first of which sniff gas is employed to supply the chlorine. The carbon bisulfide mixture introduced into the first zone contains by weight from 5% to 35%, preferably 8% to 25% of carbon bisulfide, from 25% to 45% preferably 35% to 45% carbon tetrachloride, and from 25% to 45% preferably 35% to 45% sulfur monochloride. This mixture is stored under a blanket of inert gas such as nitrogen because it is flammable.

Such mixtures may be produced, for example, by reacting sulfur monochloride with carbon bisulfide, as disclosed for example in copending application Serial No. 830,410 filed July 29, 1959. Carbon bisulfide vapor may be added to the mixtures produced by reaction of sulfur monochloride with carbon bisulfide to provide the desired carbon bisulfide concentration in the mixture.

Such mixtures and the sniff gas are introduced continuously into the first zone under reflux conditions. A side stream of the condensate from the reflux condenser returning to the reactor is passed through a colorimeter, for example, of a well-known type involving a beam of filtered light passing through a layer of the condensate and energizing a photo-electric cell which effects operation of a control valve. In this preferred embodiment, the photo-electric cell actuates a valve which controls the recirculation of the mixture through the initial reaction zone to which the sniff gas is fed continuously to decrease the flow of such mixture whenever the color becomes lighter and increase the flow when the color becomes darker (more red). The first zone is controlled in this way so that the flow of chlorine in the sniff gas may be independently variable in accord with requirements of the chlorine plant operations.

The reaction mixture is continuously withdrawn from the first (sniff chlorination) zone and introduced into the second zone maintained under reflux conditions, into which chlorine is supplied continuously. The amount of chlorine thus supplied is controlled by a colorimeter individual to the second zone and which actuates the chlorine controlling valve to supply more chlorine when the color becomes lighter and less chlorine when the color becomes darker. From the second zone, the reaction mixture is withdrawn continuously and introduced into the third or discharge zone maintained under reflux conditions. The colorimeters controlling chlorination carried out in the first and second zones are set to effect in these two zones chlorination of from 80% to 98% of the total amount of carbon bisulfide present in the mixture passing through these two zones.

The third zone is also provided with a colorimeter which may control either the chlorine feed or the feed of the reaction mixture from zone 2 into zone 3 to substantially complete the chlorination and leave in the reaction product discharged from zone 3, 0.03% to 0.1% carbon bisulfide. This small amount of carbon bisulfide is sufficient to react with any sulfur dichloride formed in accordance with Equation 3 above.

The accompanying drawing is a flow sheet showing one preferred arrangement of equipment for practicing the process of this invention.

In this drawing, 10 indicates the chlorinator feed tank to which carbon bisulfide may be supplied from line 11 and a mixture containing carbon bisulfide, sulfur monochloride and carbon tetrachloride from line 12. Feed tank 10 communicates with pump 13 which discharges into branch line 14 leading into reaction zone 1. Reaction mixture from zone 1 flows continuously through line 16 to the tank 10. Sniff gas is supplied to zone 1 through line 17. Reflux condenser 18 communicates with zone 1 through vapor line 19; the condensate returns through line 21. A branch 22 leads from condensate return line 21 through which branch 22 liquid flows to the colorimeter 23, thence to the reaction zone 1. Colorimeter 23, which may be of any well known type, operates control valve 24 in branch line 14.

Vent gas, i.e. non-condensables, introduced into the system, is discharged from reflux condenser 18 through line 25.

Pump 13 also supplies partially chlorinated reaction mixture from feed tank 10 to a branch 26, flow through which is controlled by regulating valve 27 which is set to give the desired rate of flow into the reaction zone 2, corresponding to the average flows of feed into tank 10 through lines 11 and 12. Reaction zone 2 communicates with the reflux condenser 29 through vapor line 31 and condensate line 32. Vent gas from condenser 29 is discharged through line 33. Chlorine is supplied continuously to reaction zone 2 through a branch line 34 leading from the main chlorine line 35. Flow through branch line 34 is controlled by a regulating valve 36 actuated by colorimeter 37 in line 38 leading from condenser 39 disposed in the vapor line 41 communicating with the top of reaction zone 2.

The reaction mixture is discharged continuously from zone 2 through line 42 into zone 3 which is the final or discharge zone of the system. Vapor line 44 from zone 3 leads to the condenser 29 which thus serves to condense the condensable vapors discharged from both zones 2 and 3. Chlorine is supplied continuously to zone 3 through branch line 45, flow through which is controlled by a regulating valve 46 actuated by the colorimeter 47 in the condensate return line 48 communicating with the condenser 49 in vapor line 51 leading from the top of reaction zone 3.

Reaction product is removed from zone 3 through a line 52 leading to the storage tank 53.

While in the embodiment shown in the drawing, the colorimeters 37 and 47 control the feed of chlorine to each of reaction zones 2 and 3, respectively, these colorimeters can be used to control the feed of carbon bisulfide-containing mixture to these reaction zones, chlorine being supplied at a constant rate and the feed of carbon bisulfide-containing material being regulated in accordance with the color of the reaction product to effect 80% to 98% chlorination in the initial stages 1 and 2 and substantially complete chlorination to the desired end-point in the final or discharge stage 3. Alternatively, only one colorimeter need be used, that associated with zone 3, to control the end-point of the reaction product in this zone, and this colorimeter employed not only to control the feed of either the chlorine or the reaction mixture into zone 3, but also the feed of either the chlorine or the carbon bisulfide-containing mixture to zone 2 at a rate proportional to the rate of feed to zone 3. Thus, for example, colorimeter 47 can be used to control the chlorine supply to both zones 2 and 3, the valves regulating such flow being set to give say 18 or 19 times the flow to zone 2 as to zone 3 so that from 90% to 95% of the chlorination is effected in zone 2 and the rest in zone 3.

The following examples are given for illustrative purposes only; it will be appreciated that this invention is not limited to these examples which illustrate preferred modes of practicing the invention. In the examples, all poundage values are pounds per minute; temperatures in ° C.; percentages are on a weight basis unless otherwise indicated.

*Example I*

This example involves the use of substantially pure chlorine and is carried out in equipment of the type shown in the drawing, but involving only two reaction zones, namely an inlet zone and a discharge zone, each having a reflux condenser communicating therewith to effect removal of the heat of reaction, with the valve controlling flow of chlorine set to give a flow of chlorine of about 19 parts to the inlet zone for each part supplied to the discharge zone. A colorimeter corresponding to 47 controls the flow of chlorine in accordance with the color of the reaction product leaving the discharge zone so as to vary this flow to both reaction zones, but always in the same ratio of 19 to 1.

In this example, the process is operated under approximately atmospheric pressure conditions; the temperature in the inlet zone is 104° and in the discharge zone is 105°. The liquid space velocity through the inlet zone is from 0.28 to 0.48 reciprocal hours and through the discharge zone is from 0.45 to 0.48 reciprocal hours. The chlorine feed rate is about 44% by weight of the liquid feed rate in the inlet zone and 0.16% in the discharge zone. By reciprocal hours is meant the number of gallons per hour of liquid passed through the zone in question divided by the volume of that zone in gallons.

100 pounds of mixture containing 15.2% carbon bisulfide, 37.1% carbon tetrachloride, 42.7% sulfur monochloride, 1.5% sulfur dichloride and 3.5% sulfur are introduced into the first zone. Also introduced into this zone are 44.1 pounds of chlorine. Both of these streams enter at atmospheric temperature (about 25°). As they mix in the body of reaction mixture in the inlet zone, the temperature rises and vapors evolve; the vapors are condensed and the condensate is returned to the body of reaction mixture in the inlet zone. The heat of reaction is removed in this way.

Partially chlorinated reaction mixture in amount of 144.1 pounds overflows from the initial zone and flows to the discharge zone, replenishing the body of reaction mixture therein. This reaction mixture contains 0.6% of carbon bisulfide, 46% carbon tetrachloride, 52.5% sulfur monochloride and 0.9% sulfur dichloride. 2.3 pounds of chlorine are continuously supplied to the discharge zone, which also operates under reflux conditions. 146.4 pounds of reaction product overflow continuously from the discharge zone and are withdrawn therefrom. This reaction product contains 0.06% carbon bisulfide, 46.3% carbon tetrachloride, 53.34% sulfur monochloride, and 0.3% sulfur dichloride.

*Example II*

This example is carried out in equipment of the type shown in the drawing. The sniff gas used contains from 10% to 60% chlorine by volume. The reaction zones are operated under a pressure of 2 to 4 p.s.i.g. The liquid space velocity through zone 1 is from 0.05 to 0.06 reciprocal hours; through zone 2 the liquid space velocity is from 0.42 to 0.61 reciprocal hours and through zone 3 the liquid space velocity is from 0.61 to 0.63 reciprocal hours. The sniff gas rate is approximately 32% of the liquid feed rate in zone 1. The chlorine feed rate to zone 2 is about 44% of the liquid feed rate to this zone. The chlorine feed rate to zone 3 is approximately 1.6% of the liquid feed rate to zone 3.

8.5 pounds of sniff gas are supplied to zone 1, which is maintained at a temperature of 85°. Continuously introduced into zone 1 are 26.3 pounds of a mixture containing 15.2% carbon bisulfide, 32.1% carbon tetrachloride, 42.7% sulfur monochloride, 1.5% sulfur dichloride and 3.5% sulfur. There passes overhead from this reaction zone 65.6 pounds consisting of 4% carbon bisulfide, 69.4% carbon tetrachloride, 11.9% sulfur monochloride, 3.5% sulfur dichloride and 11.2% inert gases. This vapor mixture is condensed in a refrigerated condenser which cools the vapors to −10° C. 7.4 pounds of air are removed continuously through the vent line 25. The condensate in the amount of 58.2 pounds consisting of 4.5% carbon bisulfide, 78.1% carbon tetrachloride, 13.4% sulfur monochloride and 4% sulfur dichloride is returned to reaction zone 1.

A reflux sample stream flows continuously to the colorimeter which controls the liquor feed rate to match the sniff chlorine gas flow containing variable amounts of chlorine. The chlorination thus effected is near the desired end-point indicated by the formation of a darker red color due to formation of sulfur dichloride. By so doing the concentration of carbon bisulfide in the reaction product leaving zone 1 is well below the flammable limit, eliminating possible hazards from the presence of air in the sniff gas.

37.4 pounds overflow continuously from reaction zone 1 and pass to the feed tank 10. This mixture contains 1.1% carbon bisulfide, 45.7% carbon tetrachloride, 52.1% sulfur monochloride and 1.1% sulfur dichloride.

There is pumped continuously from tank 10, 215.3 pounds consisting of 15.2% carbon bisulfide, 37.1% carbon tetrachloride, 42.7% sulfur monochloride, 1.5% sulfur dichloride and 3.5% sulfur. Zone 2 is maintained at a temperature of 104° by removing the heat of reaction in the reflux condenser communicating therewith. There is continuously introduced into this zone 95 pounds of chlorine. 310.8 pounds of partially chlorinated reaction mixture containing 0.5% carbon bisulfide, 46.0% carbon tetrachloride, 52.5% sulfur monochloride and 1% sulfur dichloride continuously overflow from zone 2 into zone 3.

The third zone is maintained at a temperature of 105°; heat of reaction is removed by the reflux condenser communicating therewith. There is continuously introduced into this zone 5 pounds of chlorine. There continuously overflows from this zone 315.2 pounds of reaction product consisting of 0.08% carbon bisulfide, 46.4% carbon tetrachloride, 53.12% sulfur monochloride and 0.4% sulfur dichloride.

The flow of chlorine to both zones 2 and 3 is regulated by the color of the reaction product produced in zone 3. Thus flow into both zones is always maintained in a ratio of 19 to 1 but is increased as the color of the reaction product produced in zone 3 becomes lighter and decreased as the color becomes darker. The values given above are average values per minute, but it will be appreciated the flow varies throughout the chlorination, constantly increasing and decreasing in accordance with the intensity of the color of the reaction product produced in the discharge zone. Surprisingly it has been found that by following this procedure, reaction product is produced having the desired end-point, viz. from 0.03% to 0.1% carbon bisulfide. This product flows to a storage tank where it is retained for a sufficient period of time to allow the slow reaction of carbon bisulfide and sulfur dichloride to take place, resulting in a mixture containing negligible concentrations of either. The resultant mixture can then be distilled to separate the carbon tetrachloride from the sulfur monochloride and the latter used for reaction with carbon bisulfide.

It will be noted that the present invention provides a continuous process of chlorinating carbon bisulfide-containing mixtures which is free of the objectionable features of batch procedures heretofore used, and which permits the ready control of the chlorination to produce a product having the desired end-point. It will be further noted that the preferred embodiment of the present invention utilizes the chlorine content of sniff gas, a by-product which was heretofore wasted, or was a nuisance to dispose of, and thus results in substantial economies in the process.

Since different embodiments of the invention could be made without departing from its scope, it is intended that all matter contained in the above description or shown in the accompanying drawing shall be interpreted as illustrative and not in a limiting sense. Thus, while the invention as described above, is carried out under atmospheric pressure conditions or pressure of a few p.s.i.g., it will be understood that superatmospheric pressure conditions of more than a few pounds may be employed. Desirably, for economic reasons, relatively low pressures are used.

What is claimed is:

1. The process of chlorinating carbon bisulfide to produce a reaction product consisting essentially of carbon tetrachloride and sulfur monochloride, which comprises continuously introducing a mixture consisting essentially of from 5% to 35% carbon bisulfide, from 25% to 45% carbon tetrachloride and from 25% to 45% sulfur monochloride into a first reaction zone; continuously introducing chlorine into the first reaction zone; continuously removing vapors from said first zone, condensing at least a portion of the vapors and returning the condensate to said first zone; continuously removing the reaction mixture from said first zone and introducing said reaction mixture into a second reaction zone; continuously introducing chlorine into the second reaction zone; continuously removing vapors from said second zone, condensing at least a portion of the vapors and returning the condensate to said second zone; continuously measuring the color of a portion of said last mentioned condensate and regulating the proportions of chlorine and said reaction mixture introduced into said second zone in accordance with the color of a reference mixture consisting essentially of carbon tetrachloride, sulfur monochloride, from 0.03% to 0.1% carbon bisulfide, and an amount of sulfur dichloride sufficient to react with the carbon bisulfide, to decrease the amount of chlorine relative to the reaction mixture within said second zone when the color of said condensate is darker than the reference color, and increase the amount of chlorine relative to said reaction mixture when the color of said condensate is lighter than the reference color, and thus produce a reaction product in said second zone consisting essentially of carbon tetrachloride, sulfur monochloride, from 0.03% to 0.1% carbon bisulfide, and an amount of sulful dichloride sufficient to react with the carbon bisulfide, and continuously withdrawing said reaction product from said second zone.

2. The process of chlorinating carbon bisulfide to produce a reaction product consisting essentially of carbon tetrachloride and sulfur monochloride, which comprises continuously introducing a stream containing from 5% to 35% carbon bisulfide, from 25% to 45% carbon tetrachloride and from 25% to 45% sulfur monochloride into a first reaction zone; continuously introducing into the first reaction zone a stream of chlorine; continuously taking off overhead from said first zone a vapor stream, condensing at least a portion of the vapors, and returning the condensate to said first zone; continuously removing the reaction mixture from the first zone and introducing said reaction mixture into a second reaction zone; continuously introducing a stream of chlorine into the second zone; continuously removing vapor from said second zone, condensing at least a portion of said vapor and returning the condensate to the second zone; continuously measuring photoelectrically the color of a portion of said last mentioned condensate and regulating the proportions of chlorine and said reaction mixture introduced into said second zone in accordance with the color of a reference mixture consisting essentially of carbon tetrachloride, sulfur monochloride, from 0.03% to 0.1% carbon bisulfide, and an amount of sulfur dichloride sufficient to react with the carbon bisulfide, to decrease the amount of chlorine relative to the reaction mixture within said second zone when the color of said condensate is darker than the reference color, and increase the amount of chlorine relative to said reaction mixture when the color of said condensate is lighter than the reference color, and thus produce a reaction product in said second zone consisting essentially of carbon tetrachloride, sulfur monochloride, from 0.03% to 0.1% carbon bisulfide, and an amount of sulfur dichloride sufficient to react with the carbon bisulfide, and continuously withdrawing said reaction product from said second zone.

3. The process as defined in claim 2, in which the amount of chlorine supplied to said second zone is regulated in accordance with the color of said condensate portion.

4. The process as defined in claim 2, including the steps of continuously measuring the color of the condensate returned to said first zone and controlling the amount of chlorine supplied to said first zone in accordance with the color of said condensate returned to the first zone.

5. The process of chlorinating carbon bisulfide to produce a reaction product consisting essentially of carbon tetrachloride and sulfur monochloride, which comprises continuously introducing a stream containing from 5% to 35% carbon bisulfide, from 25% to 45% carbon tetrachloride and from 25% to 45% sulfur monochloride into a first reaction zone; continuously introducing into the first reaction zone a stream of chlorine; continuously taking off overhead from said first zone a vapor stream, condensing at least a portion of said vapor stream, and returning the condensate to said first zone; continuously removing the reaction mixture from the first zone and introducing said reaction mixture into a second reaction zone; continuously introducing a stream of chlorine into the second zone; continuously removing vapor from said second zone, condensing at least a portion of said vapor and returning the condensate to the second zone; continuously measuring photoelectrically the color of a portion of said last mentioned condensate and regulating the flow of chlorine into both of said zones in accordance with the color of a reference mixture consisting essentially of carbon tetrachloride, sulfur monochloride, from 0.03% to 0.1% carbon bisulfide, and an amount of sulfur dichloride sufficient to react with the carbon bisulfide, to decrease the amount of chlorine relative to the reaction mixture within both of said zones when the color of said last mentioned condensate is darker than the reference color, and increase the amount of chlorine relative to said reaction mixture when the color of said last mentioned condensate is lighter than the reference color, and thus produce a reaction product in said second zone consisting essentially of carbon tetrachloride, sulfur monochloride, from 0.03% to 0.1% carbon bisulfide, and an amount of sulfur dichloride sufficient to react with the carbon bisulfide, and continuously withdrawing said reaction product from said second zone.

6. The process of chlorinating a carbon bisulfide-containing mixture having a carbon bisulfide content of 8% to 25%, a carbon tetrachloride content of from 35% to 45%, and a sulfur monochloride content of from 35% to 45% to produce a reaction product consisting essentially of carbon tetrachloride, sulfur monochloride, and from 0.03% to 0.1% carbon bisulfide, which comprises continuously supplying to a first zone maintained under reflux conditions a stream of dilute chlorine (sniff) gas and said carbon bisulfide-containing mixture; continuously maintaining a second zone under reflux conditions; continuously supplying to said second zone reaction mixture from said first zone and a chlorine stream; continuously removing from said second zone partially chlorinated reaction material and introducing same into a third zone maintained under reflux conditions; continuously supplying chlorine to the third zone; continuously measuring the color of a portion of the reflux condensate from said third zone and regulating the amount of chlorine supplied to the third zone in accordance with the color of a reference mixture consisting essentially of carbon tetrachloride, sulfur monochloride, from 0.03% to 0.1% carbon bisulfide, and an amount of sulfur dichloride sufficient to react with the carbon bisulfide, to decrease the chlorine feed to the third zone whenever the color of said reflux condensate is darker than the reference color, and increase the chlorine feed to said third zone whenever the color of said reflux condensate is lighter than the reference color, to produce a reaction product in said third zone consisting essentially of carbon tetrachloride, sulfur monochloride, from 0.03% to 0.1% carbon bisulfide, and an amount of sulfur dichloride sufficient to react with the carbon bisulfide, and continuously withdrawing said reaction product from said third zone.

7. The process as defined in claim 6, including the step of regulating the proportions of said chlorine streams, said carbon bisulfide-containing mixture and said reaction mixture supplied to said first and second zones to effect in said first and second zones chlorination of from 80% to 98% of the carbon bisulfide supplied to the first zone.

References Cited in the file of this patent

UNITED STATES PATENTS

| | | |
|---|---|---|
| 1,260,622 | Baillio | Mar. 26, 1918 |
| 1,817,123 | Brallier et al. | Aug. 4, 1931 |
| 2,016,804 | Nichols | Oct. 8, 1935 |